United States Patent
Odani et al.

(10) Patent No.: US 12,224,396 B2
(45) Date of Patent: Feb. 11, 2025

(54) ELECTROLYTIC SOLUTION AND SECONDARY BATTERY

(71) Applicant: MURATA MANUFACTURING CO., LTD., Kyoto (JP)

(72) Inventors: Toru Odani, Kyoto (JP); Yoshihide Nagata, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 620 days.

(21) Appl. No.: 17/538,114

(22) Filed: Nov. 30, 2021

(65) Prior Publication Data
US 2022/0093963 A1 Mar. 24, 2022

Related U.S. Application Data

(63) Continuation of application No. PCT/JP2020/021388, filed on May 29, 2020.

(30) Foreign Application Priority Data

May 31, 2019 (JP) .................................. 2019-102662

(51) Int. Cl.
 *H01M 10/0525* (2010.01)
 *H01M 4/131* (2010.01)
 *H01M 4/505* (2010.01)
 *H01M 10/0567* (2010.01)

(52) U.S. Cl.
 CPC ....... *H01M 10/0525* (2013.01); *H01M 4/131* (2013.01); *H01M 4/505* (2013.01); *H01M 10/0567* (2013.01)

(58) Field of Classification Search
 CPC .. H01M 10/0525; H01M 4/131; H01M 4/505; H01M 10/0567; H01M 2004/027; H01M 4/134; H01M 10/052; Y02E 60/10
 See application file for complete search history.

(56) References Cited

U.S. PATENT DOCUMENTS

| | | | |
|---|---|---|---|
| 6,255,021 B1 | 7/2001 | Kusumoto et al. | |
| 9,660,703 B1 * | 5/2017 | Knoedgen | H04B 5/79 |
| 2004/0146786 A1 | 7/2004 | Sato et al. | |
| 2005/0089758 A1 | 4/2005 | Kim et al. | |
| 2009/0092892 A1 * | 4/2009 | Yamaguchi | H01M 4/134 |
| | | | 204/554 |
| 2010/0209778 A1 | 8/2010 | Jouanneau-Si Larbi et al. | |
| 2016/0359158 A1 * | 12/2016 | Janakiraman | H01M 10/0525 |
| 2020/0411920 A1 * | 12/2020 | Suzuki | H01M 10/486 |

FOREIGN PATENT DOCUMENTS

| | | |
|---|---|---|
| JP | H1154132 A | 2/1999 |
| JP | 2005129533 A | 5/2005 |
| JP | 2010529608 A | 8/2010 |
| WO | 2002093679 A1 | 11/2002 |

OTHER PUBLICATIONS

International Search Report for Application No. PCT/JP2020/021388, dated Sep. 1, 2020.

* cited by examiner

*Primary Examiner* — Muhammad S Siddiquee
(74) *Attorney, Agent, or Firm* — K&L Gates LLP

(57) ABSTRACT

An electrolytic solution includes at least one compound of a first oxazoline-based compound having a molecular weight of 200 or less and a second oxazoline-based compound having a molecular weight of 200 or less, and the electrolytic solution includes no dioxolane.

13 Claims, 3 Drawing Sheets

ELECTROLYTIC SOLUTION AND SECONDARY BATTERY

CROSS REFERENCE TO RELATED APPLICATIONS

The present application is a continuation of PCT patent application no. PCT/JP2020/021388, filed on May 29, 2020, which claims priority to Japanese patent application no. JP2019-102662 filed on May 31, 2019, the entire contents of which are being incorporated herein by reference.

BACKGROUND

The present disclosure relates to an electrolytic solution and a secondary battery.

In recent years, a secondary battery has been widely used as a power source for electronic devices, electric vehicles, and the like. The characteristics of the secondary battery greatly depend on the electrolytic solution to be used, and therefore various investigations have been performed on the electrolytic solution.

SUMMARY

The present disclosure relates to an electrolytic solution and a secondary battery.

In recent years, a battery has been used as a power source for various electronic devices, electric vehicles, and the like, and thus it is desired to suppress gas generation in order to further improve battery quality.

An object of the present disclosure is to provide an electrolytic solution and a secondary battery capable of suppressing gas generation.

According to an embodiment of the present disclosure, an electrolytic solution is provided. The electrolytic solution includes at least one compound of a first compound represented by a chemical formula (1) and having a molecular weight of 200 or less and a second compound represented by a chemical formula (2) and having a molecular weight of 200 or less, and the electrolytic solution includes no dioxolane,

[Chemical Formula 1]

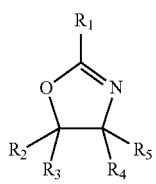

(1)

wherein, $R_1$ to $R_5$ each independently represent at least one of a hydrocarbon group, a halogen group, or a hydrogen group, and

[Chemical Formula 2]

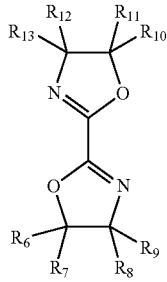

(2)

wherein, $R_6$ to $R_{13}$ each independently represent at least one of a hydrocarbon group, a halogen group, or a hydrogen group.

According to an embodiment of the present disclosure, the content of the at least one compound described above is preferably from 0.001% by mass to 1% by mass. When the electrolytic solution includes both the first compound and the second compound, the content of the at least one compound described above means the total content of the first compound and the second compound.

According to an embodiment of the present disclosure, a non-aqueous electrolytic secondary battery is provided. The non-aqueous electrolytic secondary battery includes a positive electrode, a negative electrode, and the non-aqueous electrolytic solution according to the embodiment as described herein.

The present disclosure can suppress gas generation in a secondary battery.

The effects described in the present specification are merely exemplary and are not limited, and there may be additional effects.

DETAILED DESCRIPTION

Figure 1:
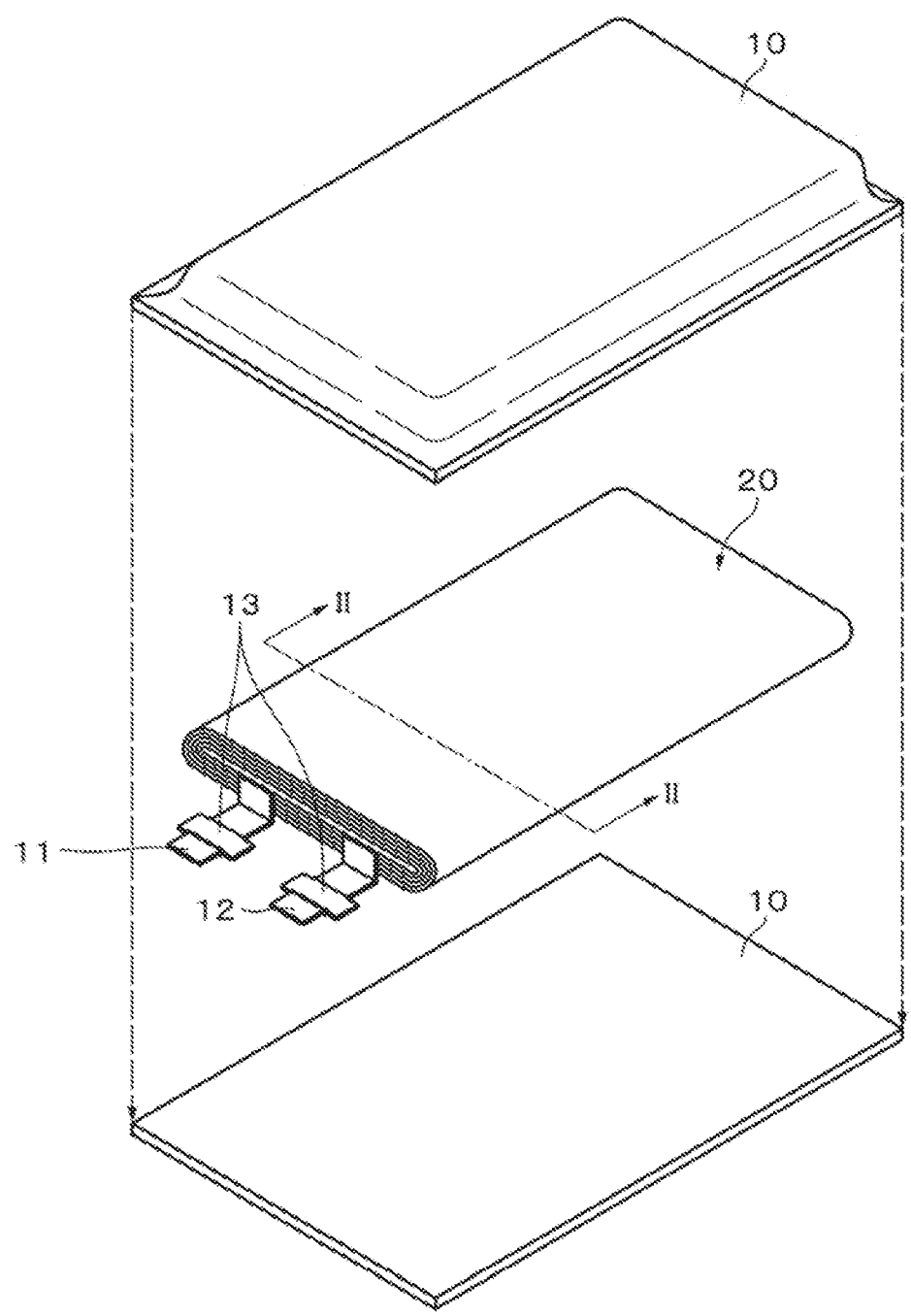
FIG. 1 is an exploded perspective view showing an example of a configuration of a non-aqueous electrolytic secondary battery according to an embodiment of the present disclosure.

As described herein, the present disclosure will be described based on examples with reference to the drawings, but the present disclosure is not to be considered limited to the examples, and various numerical values and materials in the examples are considered by way of example.

The electrolytic solution according to the first embodiment of the present disclosure is a so-called non-aqueous electrolytic solution, and includes an organic solvent (non-aqueous solvent), an electrolyte salt, and an additive. The electrolytic solution is suitable for use in a non-aqueous electrolytic secondary battery (hereinafter, simply referred to as a "battery") such as a lithium ion secondary battery.

A cyclic carbonate ester such as ethylene carbonate, propylene carbonate, or butylene carbonate can be used as the organic solvent, and one of ethylene carbonate and propylene carbonate, particularly a mixture of both is preferably used. This is because the cycle characteristics can be improved.

In addition to these cyclic carbonate esters, a chain carbonate ester such as diethyl carbonate, dimethyl carbonate, ethyl methyl carbonate, or methyl propyl carbonate is preferably mixed and used as the organic solvent. This is because high ion conductivity can be obtained.

In addition to these, examples of the organic solvent include at least one selected from the group consisting of: chain carboxylic acid esters such as ethyl acetate, ethyl propionate, propyl propionate, methyl butyrate, methyl isobutyrate, and methyl trimethylacetate; lactones such as γ-butyrolactone and γ-valerolactone; ethers such as 1,2-dimethoxyethane, tetrahydrofuran, 2-methyltetrahydrofuran, 1,3-dioxolane, and 4-methyl-1,3-dioxolane; nitrile compounds such as acetonitrile, glutaronitrile, adiponitrile, methoxyacetonitrile, and 3-methoxypropionitrile; N,N-dimethylformamide; N-methylpyrrolidinone; N-methyloxazolidinone; N,N-dimethylimidazolidinone; nitromethane; nitroethane; sulfolane; dimethylsulfoxide; and trimethyl phosphate.

In addition, the organic solvent can further include halogenated carbonic acid esters such as 4-fluoro-1,3-dioxolane-2-one, unsaturated cyclic carbonic acid esters such as vinylene carbonate, sulfonic acid esters such as 1,3-propenesultone, acid anhydrides such as carboxylic acid anhydrides, disulfonic acid anhydrides, and carboxylic acid sulfonic acid anhydrides, and phosphoric acid esters such as trimethyl phosphate. For example, vinylene carbonate can improve cycle characteristics.

A compound obtained by substituting at least a part of hydrogen in these organic solvents with fluorine may be preferable because the reversibility of the electrode reaction may be improved depending on the type of the electrode to be combined.

Examples of the electrolyte salt include lithium salts, and the electrolyte salt may be used singly, or may be used in combination of two or more. Examples of the lithium salt include $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiCl, lithium difluoro[oxolato-O,O']borate, lithium bisoxalate borate, or LiBr. Of these, $LiPF_6$ is preferable because high ion conductivity can be obtained and cycle characteristics can be improved.

The additive includes an oxazoline-based compound and includes no dioxolane. Herein, the oxazoline-based compound means oxazoline or a compound having an oxazoline group in the molecule. The oxazoline-based compound includes no silicon (for example, a silicate compound). Specifically, the oxazoline-based compound includes at least one of a first compound represented by the following formula (1) and having a molecular weight of 200 or less and a second compound represented by the following formula (2) and having a molecular weight of 200 or less.

The additive includes the oxazoline-based compound, whereby the oxazoline-based compound is decomposed at the electrode during charging or the like, and a good film derived from the oxazoline-based compound is formed on the electrode. Such a film formed on the electrode suppresses decomposition of the electrolytic solution during charging or the like to suppress gas generation. Herein, the electrode means at least one of a positive electrode and a negative electrode. In addition, the additive includes no dioxolane, and therefore gas generation due to oxidative decomposition of dioxolane during charging or the like is also suppressed.

When the oxazoline-based compound includes silicon (for example, a silicate compound), fluorine supplied from a fluorine-containing lithium salt (for example, $LiPF_6$) reacts with the oxazoline-based compound to generate a gas (gas having a Si—F bond). Therefore, the oxazoline-based compound does not contribute to film formation. Whereas, in the first embodiment, both the oxazoline-based compounds represented by the formula (1) and the formula (2) include no silicon (for example, a silicate compound or the like), thus allowing prevention of generation of a gas (gas having a Si—F bond) due to a reaction between fluorine supplied from a fluorine-containing lithium salt and the oxazoline-based compound,

(1)

wherein, $R_1$ to $R_5$ each independently represent a hydrocarbon group optionally having a substituent, a halogen group, or a hydrogen group, and

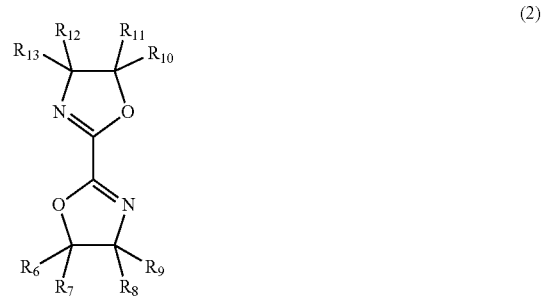

(2)

wherein, $R_6$ to $R_{13}$ each independently represent an optionally substituted hydrocarbon group, halogen group, or hydrogen group.

In the formulae (1) and (2), the hydrocarbon group is a generic term for groups composed of carbon (C) and hydrogen (H), and may be a saturated hydrocarbon group, or an unsaturated hydrocarbon group. Herein, the saturated hydrocarbon group is an aliphatic hydrocarbon group having no carbon-carbon multiple bond, and the unsaturated hydrocarbon group is an aliphatic hydrocarbon group having a carbon-carbon multiple bond (carbon-carbon double bond or carbon-carbon triple bond). In addition, the hydrocarbon group may be linear, branched having one or more side chains or the like, or cyclic having one or more rings.

Examples of the substituent that the hydrocarbon group optionally has include an alkyl group, an alkenyl group, an alkynyl group, an alkylene group, an alkenylene group, or an alkynylene group, having at least one selected from the group consisting of, for example, oxygen, nitrogen, and halogen.

When the formula (1) includes a hydrocarbon group, the number of carbon atoms included in the hydrocarbon group is preferably 1 or more and 4 or less. When the formula (1) includes a halogen group, the halogen group is, for example, a fluorine group (—F), a chlorine group (—Cl), a bromine group (—Br), or an iodine group (—I), preferably a fluorine group (—F).

When the formula (2) includes a hydrocarbon group, the number of carbon atoms included in the hydrocarbon group is preferably 1 or more and 4 or less. When the formula (2) includes a halogen group, the halogen group is, for example, a fluorine group (—F), a chlorine group (—Cl), a bromine group (—Br), or an iodine group (—I), preferably a fluorine group (—F).

Specific examples of the first compound include compounds represented by the following formulas (1-1) to (1-11) (hereinafter, also referred to as compounds (1-1) to (1-11)). These may be used singly or in combination of two or more.

(1-1)

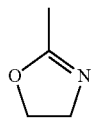
(1-2)

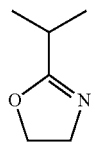
(1-3)

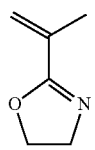
(1-4)

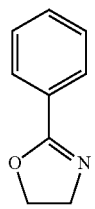
(1-5)

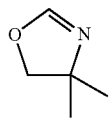
(1-6)

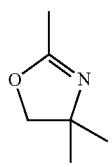
(1-7)

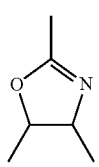
(1-8)

-continued

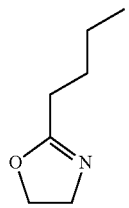
(1-9)

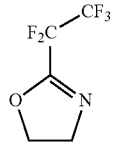
(1-10)

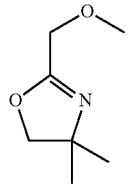
(1-11)

Specific examples of the first compound include compounds represented by the following formula (2-1) (hereinafter, also referred to as compound (2-1)).

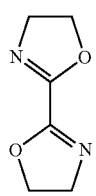
(2-1)

When the molecular weights of the first compound and the second compound are 200 or less, an increase in the viscosity of the electrolytic solution is suppressed, and a decrease in the diffusibility of lithium ions is suppressed. This suppresses a decrease in ionic conductivity of the electrolytic solution.

The molecular weights of the first compound and the second compound are determined by performing mass spectrum (MS) measurement and obtaining a molecular ion peak. The ionization method in the MS measurement is not particularly limited; however, the molecular weight can be easily measured by a soft ionization method that prevents fragment ionization and generates a molecular ion peak, for example, a field ionization (FI) method.

The content of the oxazoline-based compound (specifically, at least one oxazoline-based compound of the first compound and the second compound) in the electrolytic solution is preferably 0.001% by mass or more and 1% by mass or less. When the content of the oxazoline-based compound is 0.001% by mass or more and 1% by mass or less, an excellent effect of suppressing gas generation can be obtained.

The content of the oxazoline-based compound in the electrolytic solution is determined by comparing a peak intensity obtained by GC-MS (Gas Chromatography-Mass Spectrometry) or LC-MS (Liquid Chromatography-Mass Spectrometry) measurement of the electrolytic solution with a peak intensity obtained by measurement of an oxazoline-based compound having a known concentration. In addition, the content of the oxazoline-based compound in the electrolytic solution can be obtained by comparing the peak intensity of the oxazoline-based compound obtained by NMR (Nuclear Magnetic Resonance) measurement of the electrolytic solution with the peak intensity of a standard substance having a known concentration.

As described above, the electrolytic solution according to the first embodiment includes an oxazoline-based compound and includes no dioxolane. The oxazoline-based compound includes at least one of the first compound represented by the above formula (1) and having a molecular weight of 200 or less and the second compound represented by the above formula (2) and having a molecular weight of 200 or less. The additive includes the oxazoline-based compound described above, thereby allowing a good film to be formed on the electrode during charging of the battery or the like. Therefore, gas generation during charging the battery or the like can be suppressed. In addition, the additive includes no dioxolane, and therefore gas generation due to oxidative decomposition of dioxolane can be prevented.

In the second embodiment, a battery including the electrolytic solution according to the first embodiment will be described.

An example of a configuration of a non-aqueous electrolytic secondary battery (hereinafter, simply referred to as a "battery") according to a second embodiment of the present disclosure will be described with reference to FIG. 1 and FIG. 2. The battery is a so-called laminated battery, and as shown in FIG. 1, includes a wound electrode assembly 20 to which a positive electrode lead 11 and a negative electrode lead 12 are attached, an electrolytic solution (not shown) as an electrolyte, and a film-shaped exterior material 10 for housing the electrode assembly 20 and the electrolytic solution, and can be reduced in size, weight, and thickness.

The positive electrode lead 11 and negative electrode lead 12 are led out from the inside to the outside of the exterior material 10, for example, in the same direction. Each of the positive electrode lead 11 and negative electrode lead 12 is composed of, for example, a metal material such as Al, Cu, Ni, or stainless steel, and has a thin plate shape or a mesh shape.

The exterior material 10 is composed of, for example, a rectangular aluminum laminate film obtained by bonding a nylon film, an aluminum foil, and a polyethylene film in this order. For example, the exterior material 10 is disposed such that the polyethylene film side and the electrode assembly 20 face each other, and outer edge portions thereof are in close contact with each other by fusion or an adhesive. An adhesive film 13 for suppressing entry of outside air is inserted between the exterior material 10 and the positive electrode lead 11 and the negative electrode lead 12. The adhesive film 13 is composed of a material having adhesion to the positive electrode lead 11 and the negative electrode lead 12, for example, a polyolefin resin such as polyethylene, polypropylene, modified polyethylene, or modified polypropylene.

The exterior material 10 may be composed of a laminate film having another structure, a polymer film such as polypropylene, or a metal film, instead of the aluminum laminate film described above. Alternatively, the exterior material 10 may be composed of a laminate film in which a polymer film is laminated on one surface or both surfaces of an aluminum film as a core material.

Figure 2:
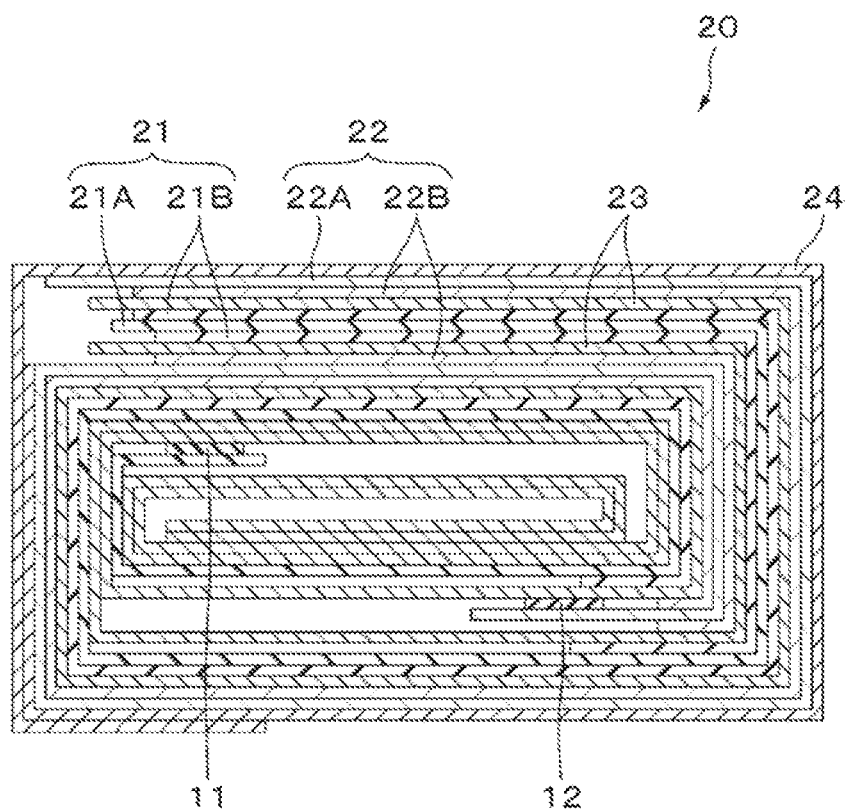
FIG. 2 is a sectional view taken along line II-II in FIG. 1.

As shown in FIG. 2, the electrode assembly 20 includes a positive electrode 21 having an elongated shape, a negative electrode 22 having an elongated shape, and a separator 23 provided between the positive electrode 21 and the negative electrode 22 and having an elongated shape. The electrode assembly 20 has a configuration in which the positive electrode 21 and the negative electrode 22 are laminated with the separator 23 interposed therebetween and are wound in a longitudinal direction so as to be flat and spiral, and the outermost peripheral portion is protected by a protective tape 24. The positive electrode 21, the negative electrode 22, and the separator 23 are impregnated with an electrolytic solution.

Hereinafter, the positive electrode 21, the negative electrode 22, the separator 23, and the electrolytic solution constituting the battery will be sequentially described.

The positive electrode 21 includes, for example, a positive electrode current collector 21A and a positive electrode active material layer 21B provided on both sides of the positive electrode current collector 21A. The positive electrode current collector 21A is composed of, for example, a metal foil such as an aluminum foil, a nickel foil, or a stainless-steel foil. The positive electrode active material layer 21B includes one or more positive electrode active materials capable of occluding and releasing lithium. The positive electrode active material layer 21B may further include at least one of a binder and/or a conductive agent as necessary.

Suitable examples of the positive electrode active material include a lithium-containing compound such as a lithium oxide, a lithium phosphorus oxide, a lithium sulfide, or an interlayer compound including lithium, and two or more thereof may be mixed and used. A lithium-containing compound including lithium, a transition metal element, and oxygen is preferable for increasing the energy density. Examples of such a lithium-containing compound include a lithium composite oxide having a layered rock-salt structure shown in a formula (A), and a lithium composite phosphate having an olivine structure shown in a formula (B). The lithium-containing compound more preferably includes at least one selected from the group consisting of Co, Ni, Mn, and Fe as a transition metal element. Examples of such a lithium-containing compound include: a lithium composite oxide having a layered rock-salt structure represented by a formula (C), a formula (D), or a formula (E); a lithium composite oxide having a spinel structure represented by a formula (F); and a lithium composite phosphate having an olivine structure represented by a formula (G), and specifically include $LiNi_{0.50}Co_{0.20}Mn_{0.30}O_2$, $LiCoO_2$, $LiNiO_2$, $LiNiaCo_{1-a}O_2$ (0<a<1), $LiMn_2O_4$, or $LiFePO_4$.

$$Li_pNi_{(1-q-r)}Mn_qM1_rO_{(2-y)}X_z \qquad (A)$$

In the formula (A), M1 represents at least one element selected from group 2 to group 15 excluding Ni and Mn. X represents at least one selected from the group consisting of group 16 elements and group 17 elements other than oxygen. Here, p, q, y, and z are values within the ranges of $0 \leq p \leq 1.5$, $0 \leq q \leq 1.0$, $0 \leq r \leq 1.0$, $-0.10 \leq y \leq 0.20$, and $0 \leq z \leq 0.2$.

$$Li_aM2_bPO_4 \qquad (B)$$

In the formula (B), M2 represents at least one element selected from group 2 to group 15. Here, a and b are values within the ranges of $0 \leq a \leq 2.0$ and $0.5 \leq b \leq 2.0$.

$$Li_fMn_{(1-g-h)}Ni_gM3_hO_{(2-j)}F_k \qquad (C)$$

In the formula (C), M3 represents at least one selected from the group consisting of Co, Mg, Al, B, Ti, V, Cr, Fe, Cu, Zn, Zr, Mo, Sn, Ca, Sr, and W. Here, f, g, h, j, and k are values within the ranges of $0.8 \leq f \leq 1.2$, $0 < g < 0.5$, $0 \leq h \leq 0.5$, g+h<1, −0.1≤j≤0.2, and 0≤k≤0.1. The composition of lithium varies depending on the condition of charge and discharge, and the value of f represents a value in a fully discharged condition.

$$Li_m Ni_{(1-n)} M4_n O_{(2-p)} F_q \quad (D)$$

In the formula (D), M4 represents at least one selected from the group consisting of Co, Mn, Mg, Al, B, Ti, V, Cr, Fe, Cu, Zn, Mo, Sn, Ca, Sr, and W. Here, m, n, p, and q are values within the ranges of 0.8≤m≤1.2, 0.005≤n≤0.5, −0.1≤p≤0.2, and 0≤q≤0.1. The composition of lithium varies depending on the condition of charge and discharge, and the value of m represents a value in a fully discharged condition.

$$Li_r Co_{(1-s)} M5_s O_{(2-t)} F_u \quad (E)$$

In the formula (E), M5 represents at least one selected from the group consisting of Ni, Mn, Mg, Al, B, Ti, V, Cr, Fe, Cu, Zn, Mo, Sn, Ca, Sr, and W. Here, r, s, t, and u are values within the ranges of 0.8≤r≤1.2, 0≤s<0.5, −0.1≤t≤0.2, and 0≤u≤0.1. The composition of lithium varies depending on the condition of charge and discharge, and the value of r represents a value in a fully discharged condition.

$$Li_v Mn_{2-w} M6_w O_x F_y \quad (F)$$

In the formula (F), M6 represents at least one selected from the group consisting of Co, Ni, Mg, Al, B, Ti, V. Cr, Fe, Cu, Zn, Mo, Sn, Ca, Sr, and W. Here, v, w, x, and y are values within the ranges of 0.9≤v≤1.1, 0≤w≤0.6, 3.7≤x≤4.1 and 0≤y≤0.1. The composition of lithium varies depending on the condition of charge and discharge, and the value of v represents a value in a fully discharged condition.

$$Li_z M7PO_4 \quad (G)$$

In the formula (G), M7 represents at least one selected from the group consisting of Co, Mg, Fe, Ni, Mg, Al, B, Ti, V, Nb, Cu, Zn, Mo, Ca, Sr, W, and Zr. Here, z is a value within a range of 0.9≤z≤1.1. The composition of lithium varies depending on the condition of charge and discharge, and the value of z represents a value in a fully discharged condition.

In addition to these, an inorganic compound including no lithium, such as $MnO_2$, $V_2O_5$, $V_6O_{13}$, NiS, or MoS, can also be used as the positive electrode active material capable of occluding and releasing lithium.

The positive electrode active material capable of occluding and releasing lithium may be other than those described above. In addition, the positive electrode active materials exemplified above may be mixed in any combination of two or more.

As a binder, there can be used at least one selected from the group consisting of, for example, polyvinylidene fluoride, polytetrafluoroethylene, polyacrylonitrile, styrene butadiene rubber, carboxymethyl cellulose, and a copolymer mainly including one of these resin materials.

As a conductive agent, there can be used at least one carbon material selected from the group consisting of, for example, graphite, carbon fiber, carbon black, acetylene black, Ketjen black, carbon nanotube, and graphene. The conductive agent may be any material having conductivity, and is not limited to a carbon material. For example, a metal material and a conductive polymer material may be used as the conductive agent. In addition, examples of the shape of the conductive agent include a granular shape, a scaly shape, a hollow shape, a needle shape, and a cylindrical shape, and are not particularly limited to these shapes.

The negative electrode 22 includes, for example, a negative electrode current collector 22A and a negative electrode active material layer 22 B provided on both sides of the negative electrode current collector 22A. The negative electrode current collector 22A is composed of, for example, a metal foil such as a copper foil, a nickel foil, or a stainless-steel foil. The negative electrode active material layer 22B includes a negative electrode active material capable of occluding and releasing lithium. The negative electrode active material layer 22B may further include at least one of a binder and a conductive agent as necessary.

In this battery, it is preferable that the electrochemical equivalent of the negative electrode 22 or the negative electrode active material is larger than the electrochemical equivalent of the positive electrode 21, and theoretically, lithium metal is not deposited on the negative electrode 22 during charging.

Examples of the negative electrode active material include carbon materials such as non-graphitizable carbon, graphitizable carbon, graphite, pyrolytic carbons, cokes, glassy carbons, organic polymer compound fired bodies, carbon fibers, or activated carbon. Of these, examples of the cokes include pitch coke, needle coke, or petroleum coke. The organic polymer compound fired body refers to a carbonized product obtained by firing a polymer material such as a phenol resin or a furan resin at an appropriate temperature, and some are classified as non-graphitizable carbon or graphitizable carbon. These carbon materials are preferable because the change in the crystal structure generated during charge and discharge is significantly small, a high charge and discharge capacity can be obtained, and good cycle characteristics can be obtained. Particularly, graphite is preferable because the electrochemical equivalent is large and a high energy density can be obtained. In addition, non-graphitizable carbon is preferable because excellent cycle characteristics can be obtained. Furthermore, those having a low charge-and-discharge potential, specifically those having a charge-and-discharge potential close to that of lithium metal are preferable because high energy density of the battery can be easily achieved.

In addition, examples of other negative electrode active materials capable of increasing the capacity include materials including at least one of a metal element and a metalloid element as a constituent element (for example, an alloy, a compound, or a mixture). This is because a high energy density can be obtained by using such a material. Particularly, use of the carbon material in combination can more preferably provide a high energy density and excellent cycle characteristics. In the present disclosure, the alloy includes an alloy including one or more metal elements and one or more metalloid elements in addition to an alloy including two or more metal elements. In addition, a non-metallic element may be included. The structure may include a solid solution, a eutectic (eutectic mixture), an intermetallic compound, or a mixture of two or more thereof.

Examples of such a negative electrode active material include a metal element or a metalloid element capable of forming an alloy with lithium. Specific examples thereof include Mg, B, Al, Ti, Ga, In, Si, Ge, Sn, Pb, Bi, Cd, Ag, Zn, Hf, Zr, Y, Pd, and Pt. These may be crystalline or amorphous.

Examples of such a negative electrode active material include those including a metal element or a metalloid element of group 4B in the short periodic table as a constituent element, and of these, those including at least one of Si and Sn as a constituent element are preferable. This is because Si and Sn have a high ability to occlude and release lithium, and a high energy density can be obtained.

Examples of such a negative electrode active material include: a simple substance, an alloy, or a compound of Si; a simple substance, an alloy or a compound of Sn; and a material having one or two or more thereof in at least a part thereof.

Examples of the alloy of Si include alloys including at least one selected from the group consisting of Sn, Ni, Cu, Fe, Co, Mn, Zn, In, Ag, Ti, Ge, Bi, Sb, Nb, Mo, Al, P, Ga, and Cr as the second constituent element other than Si. Examples of the alloy of Sn include alloys including at least one selected from the group consisting of Si, Ni, Cu, Fe, Co, Mn, Zn, In, Ag, Ti, Ge, Bi, Sb, Nb, Mo, Al, P, Ga, and Cr as the second constituent element other than Sn.

Examples of the compound of Sn or the compound of Si include compounds including O or C as a constituent element. These compounds may include the second constituent element described above.

Particularly, the Sn-based negative electrode active material preferably includes Co, Sn, and C as constituent elements, and has a low crystallinity or an amorphous structure.

Examples of other negative electrode active materials include metal oxides or polymer compounds capable of occluding and releasing lithium. Examples of the metal oxide include lithium titanium oxide including Li and Ti, such as lithium titanate ($Li_4Ti_5O_{12}$), iron oxide, ruthenium oxide, or molybdenum oxide. Examples of the polymer compound include polyacetylene, polyaniline, or polypyrrole.

The same binder as the positive electrode active material layer 21B can be used as the binder.

The same conductive agent as the positive electrode active material layer 21B can be used as the conductive agent.

The separator 23 separates the positive electrode 21 and the negative electrode 22, prevents a short circuit due to contact with both electrodes each other, and allows permeation of lithium ions. The separator 23 is composed of, for example, a porous film consisting of polytetrafluoroethylene, a polyolefin resin (for example, polypropylene (PP) or polyethylene (PE)), an acrylic resin, a styrene resin, a polyester resin, a nylon resin, or a resin obtained by blending these resins, and may have a structure in which two or more of these porous films are laminated.

Of these, a porous membrane consisting of polyolefin is preferable because of having an excellent short-circuit preventing effect and allowing improvement in the safety of the battery by a shutdown effect. Particularly, polyethylene is preferable as a material constituting the separator 23 because polyethylene can provide a shutdown effect within a range of 100° C. or more and 160° C. or less and is also excellent in electrochemical stability. Of these, low-density polyethylene, high-density polyethylene, and linear polyethylene are preferably used because of having an appropriate melting temperature and being easily available. In addition, there can be used a material obtained by copolymerizing or blending a resin having chemical stability with polyethylene or polypropylene. Alternatively, the porous membrane may have a structure of three or more layers in which a polypropylene layer, a polyethylene layer, and a polypropylene layer are sequentially laminated. For example, it is desirable to have a three-layer structure of PP/PE/PP, and the mass ratio [wt %] of PP and PE is PP:PE=60:40 to 75:25. Alternatively, from the viewpoint of cost, the single layer substrate having 100 wt % of PP or 100 wt % of PE may be used. The method for producing the separator 23 may be wet or dry.

A nonwoven fabric may be used as the separator 23. For example, aramid fibers, glass fibers, polyolefin fibers, polyethylene terephthalate (PET) fibers, or nylon fibers can be used as the fibers constituting the nonwoven fabric. In addition, two or more of these fibers may be mixed to be formed into a nonwoven fabric.

The separator 23 may have a configuration including a substrate and a surface layer provided on one surface or both surfaces of the substrate. The surface layer includes inorganic particles having electrical insulation properties and a resin material that binds the inorganic particles to the surface of the substrate and binds the inorganic particles to each other. This resin material may have a three-dimensional network structure in which, for example, a plurality of fibrils are connected by fibrillation. The inorganic particles are supported on the resin material having the three-dimensional network structure. In addition, the resin material may bind the surface of the substrate or the inorganic particles to each other without fibrillation. In this case, higher binding properties can be obtained. Providing the surface layer on one surface or both surfaces of the substrate as described above can enhance oxidation resistance, heat resistance, and mechanical strength of the separator 23.

It is preferable that the substrate is a porous membrane composed of an insulating film that permeates lithium ions and has a predetermined mechanical strength, and has characteristics of high resistance to the electrolytic solution, low reactivity, and difficulty in expansion because the electrolytic solution is held in the pores of the substrate.

A resin material or a nonwoven fabric constituting the separator 23 described above can be used as the material constituting the substrate.

The inorganic particles includes at least one selected from the group consisting of, for example, a metal oxide, a metal nitride, a metal carbide, and a metal sulfide. The metal oxide that can be preferably used includes, for example, aluminum oxide (alumina, $Al_2O_3$), boehmite (hydrated aluminum oxide), magnesium oxide (magnesia, MgO), titanium oxide (titania, $TiO_2$), zirconium oxide (zirconia, $ZrO_2$), silicon oxide (silica, $SiO_2$), and yttrium oxide (Yttria, $Y_2O_3$). The metal nitride that can be preferably used includes, for example, silicon nitride ($Si_3N_4$), aluminum nitride (AlN), boron nitride (BN), and titanium nitride (TiN). The metal carbide that can be preferably used includes, for example, silicon carbide (SiC) and boron carbide ($B_4C$). The metal sulfide that can be preferably used include, for example, barium sulfate ($BaSO_4$). Of the metal oxides described above, alumina, titania (particularly having a rutile structure), silica, or magnesia is preferably used, and alumina is more preferably used.

In addition, the inorganic particles may include minerals such as porous aluminosilicate such as zeolite ($M_{2/n}O \cdot Al_2O_3 \cdot xSiO_2 \cdot yH_2O$, M is a metal element, $x \geq 2$, $y \geq 0$), layered silicate, barium titanate ($BaTiO_3$), or strontium titanate ($SrTiO_3$). The inorganic particles have oxidation resistance and heat resistance, and the surface layer on the side surface facing the positive electrode containing the inorganic particles has strong resistance to an oxidation environment in the vicinity of the positive electrode during charging. The shape of the inorganic particles is not particularly limited, and any of spherical, plate, fibrous, cubic, and random shapes can be used.

The average particle size of the inorganic particles is preferably in a range of 1 nm or more and 10 μm or less. This is because the particle size smaller than 1 nm is difficult to obtain, and the particle size larger than 10 μm results in an increase in the distance between the electrodes and limitation of space, whereby the active material filling amount cannot be sufficiently obtained and the battery capacity decreases.

Examples of the resin material constituting the surface layer include: a fluorine-containing resin such as polyvinylidene fluoride and polytetrafluoroethylene; fluorine-containing rubber such as vinylidene fluoride-tetrafluoroethylene copolymer and ethylene-tetrafluoroethylene copolymer; rubbers such as a styrene-butadiene copolymer or a hydride thereof, an acrylonitrile-butadiene copolymer or a hydride thereof, an acrylonitrile-butadiene-styrene copolymer or a hydride thereof, a methacrylic acid ester-acrylic acid ester copolymer, a styrene-acrylic acid ester copolymer, an acrylonitrile-acrylic acid ester copolymer, ethylene propylene rubber, polyvinyl alcohol, and polyvinyl acetate,

- cellulose derivatives such as ethyl cellulose, methyl cellulose, hydroxyethyl cellulose, and carboxymethyl cellulose; polyphenylene ether; polysulfone; polyether sulfone; polyphenylene sulfide; polyether imide; polyimide; polyamide such as wholly aromatic polyamide (aramid); polyamide imide; polyacrylonitrile; polyvinyl alcohol; polyether; and
- a resin having high heat resistance such as acrylic acid resin and polyester, in which at least one of a melting point and a glass transition temperature is 180° C. or more. These resin materials may be used singly or in combination of two or more. Of these, a fluorine-based resin such as polyvinylidene fluoride is preferable from the viewpoint of oxidation resistance and flexibility, and aramid or polyamideimide is preferably included from the viewpoint of heat resistance.

Examples of the method for forming the surface layer include a method of applying a slurry composed of a matrix resin, a solvent, and inorganic particles onto a substrate (porous film), passing through a poor solvent of the matrix resin and a good solvent bath of the solvent to cause phase separation, and then drying.

The inorganic particles described above may be contained in a porous film as the substrate. In addition, the surface layer may include no inorganic particles and may be composed only of a resin material.

The electrolytic solution according to the first embodiment described above is used as the electrolytic solution. The battery may include, as an electrolyte, an electrolyte layer including an electrolytic solution and a polymer compound serving as a holding body for holding this electrolytic solution, instead of the electrolytic solution. In this case, the electrolyte layer may be in a gel state.

The positive electrode potential (vsLi/Li$^+$) in the fully charged state is preferably more than 4.20 V, more preferably 4.25 V or more, still more preferably more than 4.40 V, particularly preferably 4.45 V or more, and most preferably 4.50 V or more. However, the positive electrode potential (vsLi/Li$^+$) in the fully charged state may be 4.20 V or less. The upper limit value of the positive electrode potential (vsLi/Li$^+$) in the fully charged state is preferably 5.00 V or less, more preferably 4.80 V or less, and still more preferably 4.70 V or less, from the viewpoint of suppressing deterioration of battery characteristics.

In the battery having the above-described configuration, when charging is performed, for example, lithium ions are released from positive electrode active material layer 21B and occluded in negative electrode active material layer 22B with the electrolytic solution interposed therebetween. In addition, when discharging is performed, for example, lithium ions are released from the negative electrode active material layer 22B and occluded in the positive electrode active material layer 21B with the electrolytic solution interposed therebetween.

Then, an example of a method for producing the battery according to the second embodiment of the present disclosure will be described.

The positive electrode 21 is produced as follows. For example, a positive electrode mixture is prepared by mixing a positive electrode active material, a binder, and a conductive agent, and this positive electrode mixture is dispersed in a solvent such as N-methyl-2-pyrrolidone (NMP) to produce a paste-like positive electrode mixture slurry. Then, this positive electrode mixture slurry is applied to both surfaces of the positive electrode current collector 21A, the solvent is dried, and compression molding is performed by, for example, a roll press machine to form positive electrode active material layer 21B, thereby providing the positive electrode 21.

The negative electrode 22 is produced as follows. For example, a negative electrode mixture is prepared by mixing a negative electrode active material and a binder, and this negative electrode mixture is dispersed in a solvent such as N-methyl-2-pyrrolidone to produce a paste-like negative electrode mixture slurry. Then, this negative electrode mixture slurry is applied to both surfaces of the negative electrode current collector 22A, the solvent is dried, and compression molding is performed by, for example, a roll press machine to form the negative electrode active material layer 22B, thereby providing the negative electrode 22.

The wound electrode assembly 20 is produced as follows. The positive electrode lead 11 is attached to one end portion of the positive electrode current collector 21A by welding, and the negative electrode lead 12 is attached to one end portion of the negative electrode current collector 22A by welding. Then, the positive electrode 21 and the negative electrode 22 are wound around a flat winding core with the separator 23 interposed therebetween and wound many times in the longitudinal direction, and then the protective tape 24 is adhered to the outermost peripheral portion to provide the electrode assembly 20.

The electrode assembly 20 is sealed by the exterior material 10 as follows. The electrode assembly 20 is sandwiched between the exterior materials 10, and the outer peripheral edge portion excluding one side is thermally fused to be formed into a bag shape, and is housed inside the exterior materials 10. Then, an adhesive film 13 is inserted between the positive electrode lead 11, the negative electrode lead 12, and the exterior material 10. The adhesive film 13 may be attached in advance to each of the positive electrode lead 11 and the negative electrode lead 12. Then, an electrolytic solution is injected into the exterior material 10 from one unfused side, and then the one unfused side is thermally fused and sealed in a vacuum atmosphere. As described above, the battery shown in FIG. 1 is obtained.

As described above, the battery according to the second embodiment includes the electrolytic solution according to the first embodiment, and therefore gas generation can be suppressed. Therefore, gas swelling of the exterior material 10 (that is, the battery) can be suppressed.

The electrolytic solution according to the first embodiment is preferably used in combination with a non-carbon-based negative electrode active material such as silicon. This is because when the electrolytic solution according to the first embodiment is used in combination with a non-carbon-based negative electrode active material such as silicon, a particularly excellent effect of suppressing gas generation can be obtained.

In the third embodiment, an electronic device including the battery according to the second embodiment described above will be described.

Figure 3:
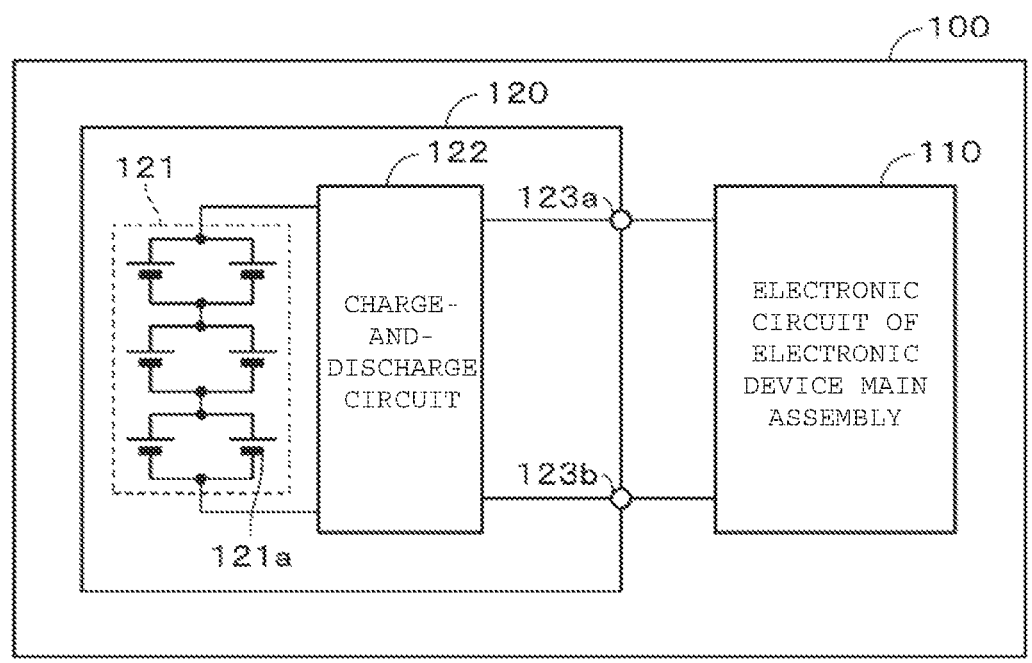
FIG. 3 is a block diagram showing an example of a configuration of an electronic device according to an embodiment of the present disclosure.

Hereinafter, an example of a configuration of an electronic device 100 according to the third embodiment of the present disclosure will be described with reference to FIG. 3. The electronic device 100 includes an electronic circuit 110 of an electronic device main assembly and a battery pack 120. The battery pack 120 is electrically connected to the electronic circuit 110 with a positive electrode terminal 123a and a negative electrode terminal 123b interposed therebetween. The electronic device 100 may have a configuration in which the battery pack 120 is detachable.

Examples of the electronic device 100 include notebook personal computers, tablet computers, mobile phones (for example, smartphones), personal digital assistants (PDA), display devices (LCD (Liquid Crystal Display), EL (Electro Luminescence) display, electronic paper, imaging devices (for example, a digital still camera, a digital video camera), audio devices (for example, portable audio players), game devices, cordless phone handsets, electronic books, electronic dictionaries, radios, headphones, navigation systems, memory cards, pacemakers, hearing aids, electric tools, electric shavers, refrigerators, air conditioners, televisions, stereos, water heaters, microwave ovens, dishwashers, washing machines, dryers, lighting devices, toys, medical devices, robots, road conditioners, or traffic lights; however, are not limited to these.

The electronic circuit 110 includes, for example, a central processing unit (CPU) or a processor, a peripheral logic unit, an interface unit, and a storage unit, and controls an entire electronic device 100.

A battery pack 120 includes an assembled battery 121 and a charge-and-discharge circuit 122. The battery pack 120 may further include an exterior member (not shown) that accommodates the assembled battery 121 and the charge-and-discharge circuit 122 as necessary.

The assembled battery 121 is composed of connection of a plurality of secondary batteries 121a in series and/or in parallel. The plurality of secondary batteries 121a are connected in, for example, n parallel m series (n and m are positive integers). FIG. 3 shows an example in which six secondary batteries 121a are connected in 2 parallel 3 series (2P3S). The battery according to the second embodiment described above is used as the secondary battery 121a.

Herein, there will be described a case where the battery pack 120 includes the assembled battery 121 including the plurality of secondary batteries 121a; however, there may be adopted a configuration in which the battery pack 120 includes one secondary battery 121a instead of the assembled battery 121.

The charge-and-discharge circuit 122 is a control unit that controls charge and discharge of the assembled battery 121. Specifically, during charging, the charge-and-discharge circuit 122 controls charging for the assembled battery 121. Whereas, during discharging (that is, during using the electronic device 100), the charge-and-discharge circuit 122 controls discharging for the electronic device 100.

A case composed of, for example, a metal, a polymer resin, or a composite material thereof can be used as the exterior material. Examples of the composite material include a laminate in which a metal layer and a polymer resin layer are laminated.

EXAMPLES

Hereinafter, the present disclosure will be specifically described with reference to examples; however, the present disclosure is not limited only to these examples.

Examples 1-1 to 1-60

The positive electrode is produced as follows. Lithium carbonate ($Li_2CO_3$) and cobalt carbonate ($CoCO_3$) were mixed at a molar ratio of lithium carbonate:cobalt carbonate of 0.5:1, and then the mixture was fired (firing temperature: 900° C., firing time: 5 hours) in air to provide lithium cobalt oxide ($LiCoO_2$) as a lithium-containing compound.

Then, 91 parts by mass of a positive electrode active material (lithium cobalt oxide), 3 parts by mass of a positive electrode binder (polyvinylidene fluoride), and 6 parts by mass of a positive electrode conductive agent (graphite) were mixed to provide a positive electrode mixture. Then, the positive electrode mixture was charged into an organic solvent (N-methyl-2-pyrrolidone), and then the organic solvent was stirred to provide a paste-shaped positive electrode mixture slurry. Then, the positive electrode mixture slurry was applied to both surfaces of a positive electrode current collector (12 μm-thick strip-shaped aluminum foil) by using a coating apparatus, and then the positive electrode mixture slurry was dried to be formed into a positive electrode active material layer. Finally, the positive electrode active material layer was compression-molded by using a roll press machine.

The negative electrode is produced as follows. 96 parts by mass of a negative electrode active material (graphite, median size D50: 15 μm), 1.5 parts by mass of a negative electrode binder (acrylic acid-modified product of styrene butadiene rubber copolymer), and 1.5 parts by mass of a thickener (carboxymethyl cellulose) were mixed to provide a negative electrode mixture. Then, the negative electrode mixture was charged into an aqueous solvent (pure water), and then the pure water was stirred to provide a paste-shaped negative electrode mixture slurry. Then, the negative electrode mixture slurry was applied to both surfaces of a negative electrode current collector (15 μm-thick strip-shaped copper foil) by using a coating apparatus, and then the negative electrode mixture slurry was dried to be formed into a negative electrode active material layer. Finally, the negative electrode active material layer was compression-molded by using a roll press machine.

The electrolytic solution was prepared as follows. Ethylene carbonate, propylene carbonate, diethyl carbonate, and propyl propionate were mixed at a mass ratio of ethylene carbonate:propylene carbonate:diethyl carbonate:propyl propionate of 30:10:40:20 to prepare a mixed solvent. Then, an electrolyte salt ($LiPF_6$) was added to the mixed solvent so as to have a concentration of 1.3 mol/kg, and the solvent was stirred to provide an electrolytic solution. Then, an additive was added to this electrolytic solution, and the solvent was stirred. The type of the additive and the content of the additive in the electrolytic solution after addition of the additive are as shown in Table 1.

A separator in which a polymer compound layer was provided on both surfaces of a substrate layer was used as the separator. This separator was produced as follows. A polymer compound (polyvinylidene fluoride) and inorganic particles (aluminum oxide, median size D50: 0.3 μm) were added to an organic solvent (N-methyl-2-pyrrolidone), and then the organic solvent was stirred to provide a dispersion. Then, the mixing ratio (mass ratio) of the polymer compound and the inorganic particles was set to polymer compound:inorganic particles=20:80. Then, the substrate layer (microporous polyethylene film having a thickness of 12 μm) was immersed in the obtained dispersion. Then, the substrate layer was taken out from the dispersion, and then the organic solvent was removed by using an aqueous solvent (pure water). Finally, the substrate layer was dried by using hot air (temperature: 80° C.) to be formed into polymer compound layers (total thickness: 5 μm) on both surfaces of the substrate layer. Thus, a separator was obtained.

The laminated battery was produced as follows. A positive electrode lead made of aluminum was welded to the positive electrode current collector, and a negative electrode lead made of copper was welded to the negative electrode current collector. Then, the positive electrode and the negative electrode were laminated with the separator interposed therebetween to provide a laminate. Then, the laminate was wound in the longitudinal direction, and then a protective tape was attached to the outermost peripheral portion of the laminate to provide a wound electrode assembly. Then, the exterior material was folded so as to sandwich the electrode assembly, and then outer peripheral edges of three sides of the exterior material were thermally fused to each other. Then, an adhesive film was inserted between the positive electrode lead and the exterior material, and an adhesive film was inserted between the negative electrode lead and the exterior material. The exterior material that was used was an aluminum laminate film in which a nylon film having a thickness of 25 μm, an aluminum foil having a thickness of 40 μm, and a polypropylene film having a thickness of 30 μm were laminated in this order from the outside. Finally, an electrolytic solution was injected into the inside of the exterior material from one unfused side of the exterior material to impregnate the electrode assembly with the electrolytic solution, and then outer peripheral edges of the one unfused side were thermally fused in a reduced-pressure environment.

This enclosed the electrode assembly in the exterior material, and the intended battery was obtained. In the step of producing the battery described above, the amount of the positive electrode active material and the amount of the negative electrode active material were adjusted such that the open circuit voltage (so-called battery voltage) during full charge of the battery was 4.45 V.

Comparative Example 1-1

A battery was obtained in the same manner as Example 1-1 except that no additive was added in the step of preparing an electrolytic solution.

Comparative Example 1-2

A battery was obtained in the same manner as Example 1-4 except that 1,3-dioxolane was further added as an additive in the step of preparing an electrolytic solution. The content of dioxolane in the electrolytic solution after addition of the additive is as shown in Table 1.

Comparative Example 1-3

A battery was produced in the same manner as Example 1-4 except that in the step of preparing an electrolytic solution, a compound represented by the following formula (3) (hereinafter, referred to as a compound (3)) was added as an additive instead of the compound represented by formula (1-1).

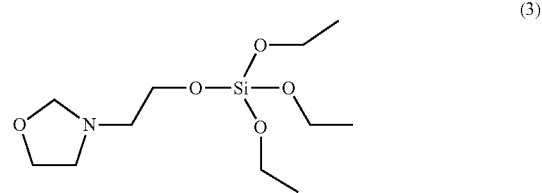 [SMILES: CCO[Si](OCC)(OCC)OCCN1CCOC1]

(3)

Examples 2-1 to 2-60 and Comparative Examples 2-1 to 2-3

A battery was obtained in the same manner as in Examples 1-1 to 1-60 and Comparative Examples 1-1 to 1-3 except that a negative electrode was produced as follows and the amount of the positive electrode active material and the amount of the negative electrode active material were adjusted such that the open circuit voltage (so-called battery voltage) during full charge of the battery was 4.4 V.

90 parts by mass of a negative electrode active material (silicon powder, average particle size 1 μm), 5 parts by mass of a graphite powder, and 5 parts by mass of a negative electrode binder (polyimide precursor) were mixed to provide a negative electrode mixture. Then, the negative electrode mixture was charged into an organic solvent (N-methyl-2-pyrrolidone), and then the organic solvent was stirred to provide a paste-shaped negative electrode mixture slurry. Then, the negative electrode mixture slurry was applied onto both surfaces of a negative electrode current collector (15 μm-thick strip-shaped copper foil) by using a coating apparatus, and then dried to be formed into a negative electrode active material layer. Finally, the negative electrode active material layer was compression-molded by using a roll press machine, and then heated at 400° C. for 12 hours in a vacuum atmosphere to be formed into a negative electrode active material layer.

The swelling characteristics of the battery obtained as described above were evaluated as follows. In order to stabilize the state of the battery, the battery was charged and discharged (2 cycles) in an ordinary temperature environment (23° C.). Then, the battery was charged again, and then the thickness T1 of the battery in the charged state was measured. Then, the battery in the charged state was stored (storage time: 100 hours) in a high temperature environment (80° C.), and then the thickness T2 of the battery in the charged state was measured. Finally, the swelling ratio [%]=((thickness T2 of battery after storage)/(thickness T1 of battery before storage))×100 was calculated.

In the evaluation of the swelling characteristics described above, the battery was charged and discharged as follows. During charging, constant current charging was performed at a current of 0.2 C until the voltage reached 4.45 V, and then constant voltage charging was performed at a voltage of 4.45 V until the current reached 0.05 C. During discharge, constant current discharge was performed at a current of 0.2 C until the voltage reached 2.5 V. "0.2 C" is a current value at which a battery is charged or discharged to its full capacity (theoretical capacity) in 5 hours. The "0.05 C" is a current value at which the battery capacity is charged or discharged in 20 hours.

Tables 1 to 4 show the types and contents of additives (compounds) included in the electrolytic solution, and evaluation results of the battery.

TABLE 1

| | Charging voltage [V] | Additive (compound) Type | Molecular weight | Content [% by mass] | Swelling ratio [%] |
|---|---|---|---|---|---|
| Example 1-1 | 4.45 | (1-1) | 71 | 0.001 | 142 |
| Example 1-2 | | | | 0.01 | 132 |
| Example 1-3 | | | | 0.1 | 131 |
| Example 1-4 | | | | 1 | 130 |
| Example 1-5 | | | | 3 | 145 |
| Example 1-6 | | (1-2) | 85 | 0.001 | 138 |
| Example 1-7 | | | | 0.01 | 126 |
| Example 1-8 | | | | 0.1 | 124 |
| Example 1-9 | | | | 1 | 125 |
| Example 1-10 | | | | 3 | 140 |
| Example 1-11 | | (1-3) | 113 | 0.001 | 136 |
| Example 1-12 | | | | 0.01 | 125 |
| Example 1-13 | | | | 0.1 | 124 |
| Example 1-14 | | | | 1 | 125 |
| Example 1-15 | | | | 3 | 139 |
| Example 1-16 | | (1-4) | 111 | 0.001 | 136 |
| Example 1-17 | | | | 0.01 | 126 |
| Example 1-18 | | | | 0.1 | 125 |
| Example 1-19 | | | | 1 | 125 |
| Example 1-20 | | | | 3 | 139 |
| Example 1-21 | | (1-5) | 147 | 0.001 | 150 |
| Example 1-22 | | | | 0.01 | 142 |
| Example 1-23 | | | | 0.1 | 140 |
| Example 1-24 | | | | 1 | 141 |
| Example 1-25 | | | | 3 | 155 |
| Example 1-26 | | (1-6) | 99 | 0.001 | 145 |
| Example 1-27 | | | | 0.01 | 135 |
| Example 1-28 | | | | 0.1 | 134 |
| Example 1-29 | | | | 1 | 134 |
| Example 1-30 | | | | 3 | 147 |
| Example 1-31 | | (1-7) | 113 | 0.001 | 146 |
| Example 1-32 | | | | 0.01 | 136 |
| Example 1-33 | | | | 0.1 | 135 |
| Example 1-34 | | | | 1 | 136 |
| Example 1-35 | | | | 3 | 149 |

TABLE 2

| | Charging voltage [V] | Additive (compound) Type | Molecular weight | Content [% by mass] | Swelling ratio [%] |
|---|---|---|---|---|---|
| Example 1-36 | 4.45 | (1-8) | 113 | 0.001 | 148 |
| Example 1-37 | | | | 0.01 | 138 |
| Example 1-38 | | | | 0.1 | 136 |
| Example 1-39 | | | | 1 | 136 |
| Example 1-40 | | | | 3 | 150 |
| Example 1-41 | | (1-9) | 127 | 0.001 | 138 |
| Example 1-42 | | | | 0.01 | 127 |
| Example 1-43 | | | | 0.1 | 126 |
| Example 1-44 | | | | 1 | 127 |
| Example 1-45 | | | | 3 | 140 |
| Example 1-46 | | (1-10) | 189 | 0.001 | 143 |
| Example 1-47 | | | | 0.01 | 133 |
| Example 1-48 | | | | 0.1 | 131 |
| Example 1-49 | | | | 1 | 131 |
| Example 1-50 | | | | 3 | 144 |
| Example 1-51 | | (1-11) | 143 | 0.001 | 148 |
| Example 1-52 | | | | 0.01 | 136 |
| Example 1-53 | | | | 0.1 | 135 |
| Example 1-54 | | | | 1 | 135 |
| Example 1-55 | | | | 3 | 147 |
| Example 1-56 | | (2-1) | 140 | 0.001 | 140 |
| Example 1-57 | | | | 0.01 | 129 |
| Example 1-58 | | | | 0.1 | 128 |
| Example 1-59 | | | | 1 | 129 |
| Example 1-60 | | | | 3 | 145 |

TABLE 2-continued

| | Charging voltage [V] | Additive (compound) Type | Molecular weight | Content [% by mass] | Swelling ratio [%] |
|---|---|---|---|---|---|
| Comparative Example 1-1 | 4.45 | None | — | — | 177 |
| Comparative Example 1-2 | 4.45 | (1-1) Dioxolane | 71 74 | 1 10 | 180 |
| Comparative Example 1-3 | 4.45 | (3) | 279 | 1 | 165 |

TABLE 3

| | Charging voltage [V] | Additive compound Type | Molecular weight | Content [% by mass] | Swelling ratio [%] |
|---|---|---|---|---|---|
| Example 2-1 | 4.4 | (1-1) | 71 | 0.001 | 158 |
| Example 2-2 | | | | 0.01 | 146 |
| Example 2-3 | | | | 0.1 | 144 |
| Example 2-4 | | | | 1 | 145 |
| Example 2-5 | | | | 3 | 160 |
| Example 2-6 | | (1-2) | 85 | 0.001 | 154 |
| Example 2-7 | | | | 0.01 | 141 |
| Example 2-8 | | | | 0.1 | 140 |
| Example 2-9 | | | | 1 | 140 |
| Example 2-10 | | | | 3 | 155 |
| Example 2-11 | | (1-3) | 113 | 0.001 | 153 |
| Example 2-12 | | | | 0.01 | 140 |
| Example 2-13 | | | | 0.1 | 139 |
| Example 2-14 | | | | 1 | 141 |
| Example 2-15 | | | | 3 | 155 |
| Example 2-16 | | (1-4) | 111 | 0.001 | 152 |
| Example 2-17 | | | | 0.01 | 141 |
| Example 2-18 | | | | 0.1 | 141 |
| Example 2-19 | | | | 1 | 141 |
| Example 2-20 | | | | 3 | 156 |
| Example 2-21 | | (1-5) | 147 | 0.001 | 168 |
| Example 2-22 | | | | 0.01 | 156 |
| Example 2-23 | | | | 0.1 | 155 |
| Example 2-24 | | | | 1 | 155 |
| Example 2-25 | | | | 3 | 170 |
| Example 2-26 | | (1-6) | 99 | 0.001 | 161 |
| Example 2-27 | | | | 0.01 | 152 |
| Example 2-28 | | | | 0.1 | 149 |
| Example 2-29 | | | | 1 | 150 |
| Example 2-30 | | | | 3 | 162 |
| Example 2-31 | | (1-7) | 113 | 0.001 | 162 |
| Example 2-32 | | | | 0.01 | 151 |
| Example 2-33 | | | | 0.1 | 150 |
| Example 2-34 | | | | 1 | 150 |
| Example 2-35 | | | | 3 | 164 |

TABLE 4

| | Charging voltage [V] | Additive (compound) Type | Molecular weight | Content [% by mass] | Swelling ratio [%] |
|---|---|---|---|---|---|
| Example 2-36 | 4.4 | (1-8) | 113 | 0.001 | 163 |
| Example 2-37 | | | | 0.01 | 151 |
| Example 2-38 | | | | 0.1 | 151 |
| Example 2-39 | | | | 1 | 152 |
| Example 2-40 | | | | 3 | 165 |
| Example 2-41 | | (1-9) | 127 | 0.001 | 155 |
| Example 2-42 | | | | 0.01 | 141 |
| Example 2-43 | | | | 0.1 | 140 |
| Example 2-44 | | | | 1 | 141 |
| Example 2-45 | | | | 3 | 155 |
| Example 2-46 | | (1-10) | 189 | 0.001 | 158 |
| Example 2-47 | | | | 0.01 | 147 |
| Example 2-48 | | | | 0.1 | 146 |

TABLE 4-continued

| | Charging voltage [V] | Additive (compound) Type | Molecular weight | Content [% by mass] | Swelling ratio [%] |
|---|---|---|---|---|---|
| Example 2-49 | | | | 1 | 146 |
| Example 2-50 | | | | 3 | 159 |
| Example 2-51 | | (1-11) | 143 | 0.001 | 164 |
| Example 2-52 | | | | 0.01 | 153 |
| Example 2-53 | | | | 0.1 | 151 |
| Example 2-54 | | | | 1 | 152 |
| Example 2-55 | | | | 3 | 165 |
| Example 2-56 | | (2-1) | 140 | 0.001 | 155 |
| Example 2-57 | | | | 0.01 | 145 |
| Example 2-58 | | | | 0.1 | 143 |
| Example 2-59 | | | | 1 | 144 |
| Example 2-60 | | | | 3 | 158 |
| Comparative Example 2-1 | 4.4 | None | — | — | 195 |
| Comparative Example 2-2 | 4.4 | (1-1) Dioxolane | 71 74 | 1 10 | 201 |
| Comparative Example 2-3 | 4.4 | (3) | 279 | 1 | 188 |

Table 1 and Table 2 indicate the following.

In a battery including an electrolytic solution including any of compounds (1-1) to (1-11) as an additive, swelling is suppressed as compared with a battery including an electrolytic solution including no additive. That is, gas generation during high-temperature storage was suppressed.

In a battery including an electrolytic solution including the compound (2-1) as an additive, swelling is suppressed as compared with a battery including an electrolytic solution including no additive. That is, gas generation during high-temperature storage was suppressed.

The effect of suppressing gas generation by the compounds (1-1) to (1-11) and (2-1) is exhibited in both a battery using graphite as a negative electrode active material and a battery using silicon as a negative electrode active material. However, the effect of suppressing gas generation by these compounds is remarkably exhibited particularly in a battery using silicon as a negative electrode active material.

In the present example, the effect of suppressing gas generation by the compound is evaluated by storing the battery at a high temperature, but this is because of evaluating the swelling characteristics by an accelerated test, and the effect of suppressing gas generation by the compound is not limited to a high temperature, and can be obtained at, for example, room temperature.

In the battery including the electrolytic solution including the compound (1-1) and dioxolane as additives, the swelling is larger than that in the battery including the electrolytic solution including no additive.

In the battery including the electrolytic solution including the compound (3) as an additive, the swelling is suppressed as compared with the battery including the electrolytic solution including no additive. However, the effect of suppressing swelling by the compound (3) is smaller than the effect of suppressing gas generation by the compounds (1-1) to (1-11) and (2-1).

The embodiments of the present disclosure have been specifically described above, the present disclosure is not limited to the above-described embodiments and examples, and various modifications based on the technical idea of the present disclosure are possible.

The configurations, methods, steps, shapes, materials, and numerical values described in the above embodiments are merely examples, and different configurations, methods, steps, shapes, materials, and numerical values may be used as necessary.

The configurations, methods, steps, shapes, materials, and numerical values of the above embodiments described above can be combined with each other without departing from the gist of the present disclosure.

The chemical formulas of, for example, the compounds exemplified in the above embodiments are representative, and are not limited to, for example, the described valences as long as the compounds have common names of the same compounds.

In the numerical range described in stages in the above embodiment, the upper limit value or the lower limit value of the numerical range in a certain stage may be replaced with the upper limit value or the lower limit value of the numerical range in another stage.

The materials exemplified in the above embodiments can be used singly or in combination of two or more, unless otherwise specified.

In the above embodiments, the case where the exterior material for housing the electrode assembly is a film-shaped exterior material has been described; however, the exterior material may be a battery can. For example, when the present disclosure is applied to a battery in which a cylindrical battery can is used as an exterior material, the operation of a safety valve due to gas generation can be suppressed.

In the above embodiments, the flat battery has been described as an example; however, the shape of the battery is not limited thereto, and the present disclosure can also be applied to batteries having various shapes such as a cylindrical shape, a square shape, a coin shape, or a button shape. In addition, the present disclosure can be applied to, for example, a flexible battery mounted on a wearable terminal such as a smart watch and a head mounted display.

In the above embodiments, an example in which the present disclosure is applied to a wound battery has been described; however, the structure of the battery is not limited thereto, and the present disclosure is also applicable to, for example, a laminated battery (stacked battery) in which a positive electrode and a negative electrode are laminated with a separator interposed therebetween, or a battery in which a positive electrode and a negative electrode are folded with a separator interposed therebetween.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An electrolytic solution, comprising a compound represented by a chemical formula (2) and having a molecular weight of 200 or less, and comprising no dioxolane,

[Chemical Formula 2]

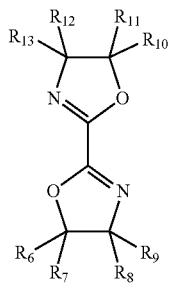

(2)

wherein in the chemical formula (2), $R_6$ to $R_{13}$ each independently represent at least one of a hydrocarbon group, a halogen group, or a hydrogen group.

2. The electrolytic solution according to claim 1, wherein a content of the at least one compound is from 0.001% by mass to 1% by mass.

3. A secondary battery, comprising:
a positive electrode;
a negative electrode; and
the electrolytic solution according to claim 1.

4. A secondary battery, comprising:
a positive electrode;
a negative electrode; and
the electrolytic solution according to claim 2.

5. The secondary battery according to claim 3, wherein the negative electrode includes silicon.

6. The secondary battery according to claim 4, wherein the negative electrode includes silicon.

7. The secondary battery according to claim 3, wherein the positive electrode includes a positive electrode current collector and a positive electrode active material layer provided on at least a side of the positive electrode current collector.

8. The secondary battery according to claim 7, wherein the positive electrode current collector includes a metal foil.

9. The secondary battery according to claim 7, wherein the positive electrode active material layer includes at least one of a binder or a conductive agent.

10. The secondary battery according to claim 3, wherein the negative electrode includes a negative electrode current collector and a negative electrode active material layer provided on at least a side of the negative electrode current collector.

11. The secondary battery according to claim 3, further comprising a separator, wherein the separator is provided between the positive electrode and the negative electrode.

12. The secondary battery according to claim 11, wherein the separator includes a porous film.

13. An electronic device, comprising:
the secondary battery according to claim 3; and
an electronic circuit;
wherein the secondary battery is electrically connected to the electronic circuit.

* * * * *